(12) United States Patent
Pogrebinsky

(10) Patent No.: US 7,673,170 B2
(45) Date of Patent: Mar. 2, 2010

(54) PERSONAL COMPUTER BUS PROTOCOL WITH ERROR CORRECTION MODE

(75) Inventor: Dmitry Pogrebinsky, Hadera (IL)

(73) Assignee: Intel Corporation, Santa Clara, CA (US)

( * ) Notice: Subject to any disclaimer, the term of this patent is extended or adjusted under 35 U.S.C. 154(b) by 565 days.

(21) Appl. No.: 11/412,000

(22) Filed: Apr. 25, 2006

(65) Prior Publication Data

US 2007/0260914 A1    Nov. 8, 2007

(51) Int. Cl.
*G06F 11/00* (2006.01)
(52) U.S. Cl. .......................................................... 714/5
(58) Field of Classification Search ........................ 714/5
See application file for complete search history.

(56) References Cited

U.S. PATENT DOCUMENTS 5,872,565 A * 2/1999 Greaves et al. .............. 715/723
6,725,312 B1 * 4/2004 Biage ........................... 710/305
2005/0177760 A1 * 8/2005 Oohira ............................ 714/2
2005/0220122 A1 * 10/2005 Kinstler ....................... 370/400
2006/0085671 A1 * 4/2006 Majni et al. .................... 714/5

OTHER PUBLICATIONS

AMIS-4168x Fault Tolerance CAN Transceiver—Data Sheet, AMI Semiconductor, Rev. 2.0—Oct. 2005—Preliminary (pp. 1-18).

* cited by examiner

*Primary Examiner*—Scott T Baderman
*Assistant Examiner*—Jigar Patel
(74) *Attorney, Agent, or Firm*—Blakely, Sokoloff, Taylor & Zafman LLP

(57) ABSTRACT

An integrated circuit device has a function block to perform a core function, a bus controller through which the function block is to communicate with another device over an attachment bus, and an error correction module (ECM). The ECM adapts a bus protocol to a failure in the bus, so that the bus protocol remains functional for the function block to communicate with the other IC device via the bus controller, despite the failure. Other embodiments are also described and claimed.

18 Claims, 3 Drawing Sheets

PERSONAL COMPUTER BUS PROTOCOL WITH ERROR CORRECTION MODE

An embodiment of the invention is related to personal computer systems and particularly to parallel multi-drop buses used in such systems. Other embodiments are also described.

BACKGROUND

Personal computer systems have a number of component integrated circuit (IC) devices that communicate with each other over a bus. Traditionally, a parallel, multi-drop bus is used to connect three or more devices, where each of the devices is connected in parallel, to the same set of transmission lines that make up the bus. More recently, serial, point-to-point buses which consist of one or more serial links that connect only two devices have been introduced in advanced, personal computer systems (e.g., Peripheral Component Interconnect, PCI, Express bus systems). To increase throughput, the parallel bus has several data lines as well as several address lines that can simultaneously carry information between two devices that are communicating with each other. The bus also has control lines that carry corresponding control signals, where these may include device select, device read, device write and clock signals (the latter being used for synchronous systems, that is where two devices communicate with each other in sync with a common clock).

A personal computer hardware platform that is based on a Pentium® processor by Intel Corp., Santa Clara, Calif., calls for a central processing unit (CPU), that may consist of one or more processors, communicating with a system interface chipset over a front side bus. The chipset may include a north bridge which allows the CPU to communicate with one or more parallel multi-drop buses in the system, e.g. a memory subsystem bus such as a synchronous dynamic random access memory (SDRAM) bus, a Peripheral Component Interconnect (PCI) bus, an Industry Standard Architecture (ISA) bus, an Advanced Graphics Port (AGP) bus, and an Advanced Technology Attachment (ATA) bus. A device may be part of a larger module, such as a dual inline memory module, or an add-in PCI card. The module or card has an electrical connector that has a number of pins which are to make contact with corresponding pins that are part of a bus connector or bus slot.

In current consumer grade personal computer systems, each parallel bus may have upwards of twenty-five pins that are required to be properly connected with their corresponding pins in a module or a card that is inserted into its slot. This connection is susceptible to failure because of bent or broken pins that do not make contact or that cause a short with an adjacent pin. Dust or debris can also be lodged against a pin thereby preventing a good electrical connection. Conventional, parallel multi-drop bus protocols respond to such failures by ceasing all communication over the bus. For example, according to the PCI protocol, if a device detects an address or a data phase error during a bus transaction, a predetermined signal is asserted by the device, where this signal is connected to error logic in a bridge that in turn interrupts the CPU. After some error logging, the system shuts down.

Conventional parallel bus protocols used in consumer grade computer systems expect a reliable connection between IC devices that are to be connected by the bus. In other words, if a device fails to pass a handshake with a bus master, then the bus master will ignore the device, that is it will indicate to the operating system that no such device is present in the system. If the device was part of a module or a card that causes one or more wires of the bus to exhibit a short circuit, then a conventional bus protocol would essentially ignore all devices on that bus, making the bus nonfunctional. If any one of such failing devices are part of a primary component of the system (e.g., main memory), then the system will shut itself down as a result.

Although error detection and correction mechanisms are used in personal computer bus protocols and in particular in main memory systems, such protocols only detect error in the storage or transmission of typically a single bit (among each multi-bit word being transferred through the bus). They make no attempt to allow the system to continue to function, using the same bus, in the event of an uncorrectable error (e.g., more than one bit is in error, or the error persists).

Catastrophic shutdown may be avoided in systems that have redundancy, that is multiple buses connecting two devices, so that if one of the buses should exhibit an uncorrectable failure, then normal communications content is automatically routed to a backup or redundant bus. Although such a solution may be justified in mission critical systems, such as those used in aircraft and spacecraft, a redundant or backup bus may be prohibitively expensive in consumer grade computer systems that are mass produced for the public.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

According to an embodiment of the invention, an IC device and a method for performing a bus protocol by an IC device are described that allow a personal computer system to operate at an application program level, without shutting down, despite a hardware failure in one or more, but not all, of the bus transmission lines (or their respective drivers and receivers) that constitute a multi-lane serial or a parallel, multi-drop bus in this system. The payload or content of bus transactions between two or more IC devices on the bus can continue to be transferred over the bus, without routing the content over a redundant or backup bus. As long as the IC devices are still operatively connected by a minimum number of transmission lines (and their respective drivers and receivers) in the bus, the bus protocol adapts itself to such a failure by entering an appropriate error correction mode and thereby remaining functional. Communication between the connected IC devices may in some cases become slower while operating in the error correction mode, in the sense that the user of the system will notice the lack of performance. However, the system does not shutdown (e.g., continues to boot or allows the user to continue running an application program, albeit at a lower performance level). Such failsafe operation is desirable in different circumstances, such as, for example, when the user is traveling with her notebook computer and does not have access to another computer or a service technician. In addition, certain users may not wish to replace a particular module or card whose bus connector exhibits a transmission line failure, if the system appears to the user to perform well enough (in an error correction mode) that it would not be worthwhile to replace just the failing module or card.

Figure 1:
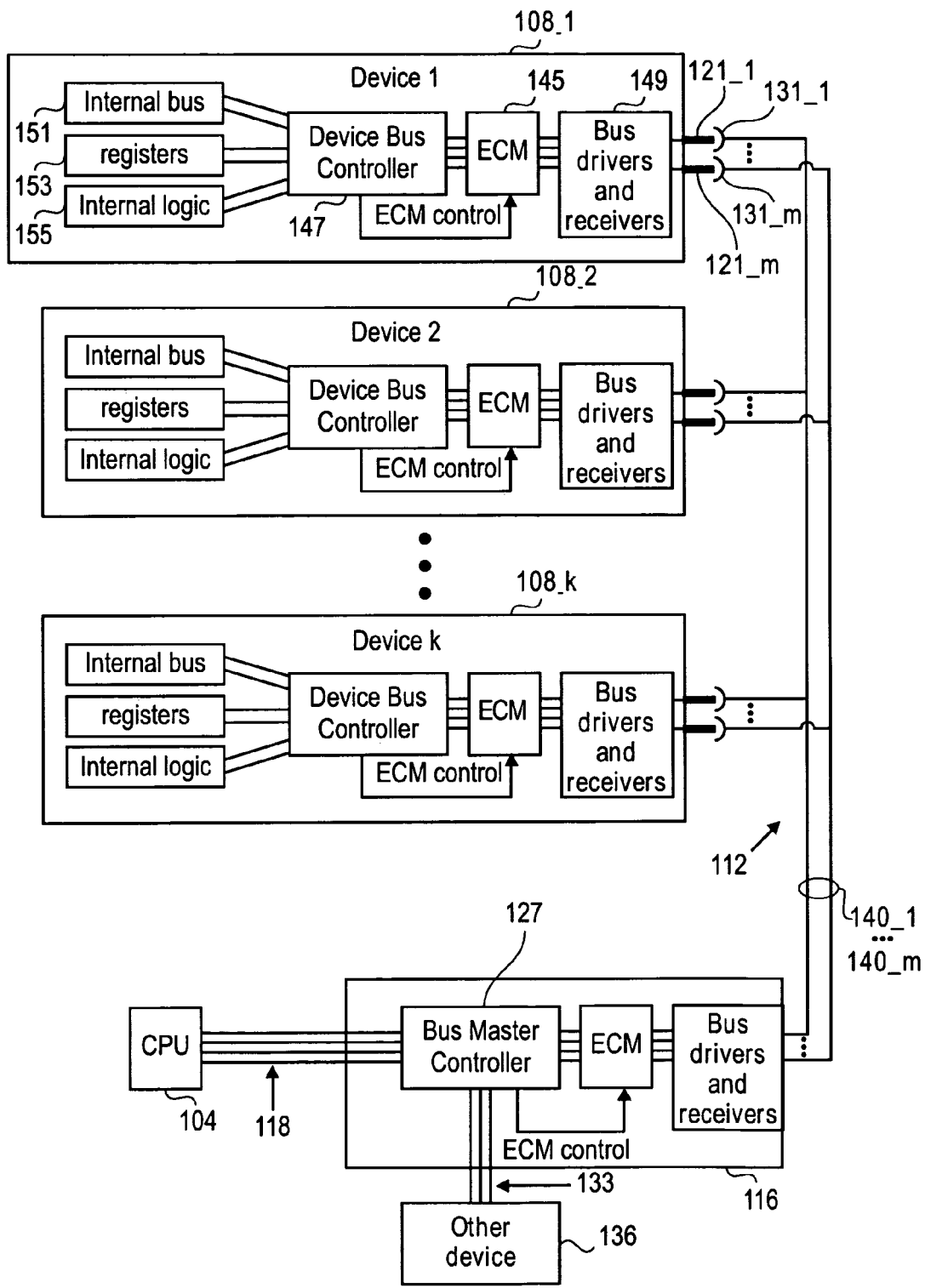
FIG. 1 is a block diagram of a computer system with error correction modules, in accordance with an embodiment of the invention.

Referring to FIG. 1, a block diagram of an example computer system, in accordance with an embodiment of the invention is shown. The system has a CPU 104 which communicates with a number of IC devices 108_1, 108_2, ... 108_k over, in this example, a parallel, multi-drop attachment bus (or bus system) 112. An IC device 116 acts as an interface between the CPU 104 and the attachment bus 112. The device 116 may include a system interface chipset or other IC component of a computer system that allows the CPU to communicate with other components on a parallel, multi-drop or serial attachment bus of the system. The device 116 serves to translate between a protocol of the CPU bus 118 and one used on the parallel multi-drop bus 112. The latter may be a PCI bus or a DRAM memory bus, whereas the former may be a front side bus by Intel Corp., Santa Clara, Calif., a serial point-to-point link, or other high performance bus that leads to the CPU 104.

The device 116 also has a bus controller 127 (or simply bus controller 127) that couples the CPU bus 118 to the attachment bus 112. This bus master controller 127 may alternatively be referred to as a bridge controller, because it acts as a bridge between the CPU bus 118 and the attachment bus 112. The bus controller 127 can also act as a bridge to other buses, such as bus 133 which connects with further devices 136 in the system. For example, bus 133 may be a dedicated, graphics processing bus that is used to transfer display data between a main memory and a graphics subsystem.

The bus 112 includes three or more (m) transmission lines 140_1, ... 140_m, which include multiple data lines for transferring data, multiple address lines for transferring address information, and multiple control lines for transferring command or clock signals between devices on the bus 112. Some of the address and data lines may be shared. For example, lines 140_1 through 140_16 may carry address information in an address phase of a bus transaction, and data information in a data phase of the same transaction. As mentioned above, there are several well known parallel bus designs that may be used to implement the bus 112. Alternatively, the parallel multi-drop version of the attachment bus 112 may be replaced with multi-lane serial point-to-point links, one for each removable connection between one of the devices 108 and the device 116.

The devices 108 may be part of memory modules, add-in cards, or other types of attachments that make a removable signal connection to the bus 112 in parallel with each other. In the examples shown, each of the connections include making electrical contact between each pin 131 of a bus slot or a bus connector that may be installed on a base printed wiring board or back plane of the system, and a corresponding pin 121 that is installed on the module or card. The bus 112 includes three or more (m) transmission lines (metal wires or conductive traces, in this example) 140_1, ..., 140_m that are shared by the different devices 108 which are connected to the bus 112. Note that the devices 108 are removable in that they can be disconnected from the bus by, for example, a user grasping the module or card and pulling it out of its slot.

The term "bus" or "bus system" as used here may include, in addition to the transmission lines 140, pins 131, 121 and bus drivers and receivers 149 in each device 108_1, 108_2, ... 108_k that is connected to the transmission lines 140. The bus drivers and receivers 149 may include 3-state logic elements or open emitter transistors that connect to the transmission lines. Alternatively, the drivers and receivers 149 may include AC coupling circuitry, to AC couple with the transmission lines. The drivers and associated receivers in general translate between on-chip, logic signaling and transmission line signaling suitable for the transmission lines 140.

The term "device" here encompasses not just any of the devices 108 or 116, but also other entities (bus agents) that are communicatively connected to the bus 112, including an IC element within a die, a packaged IC die, a module, or a circuit card. For example, each device 108 may be a DRAM module where in that case, the internal logic 155 represents a random access memory storage array. Similarly, in device 116, the bus master controller 127 would represent a memory controller that is to access the device 108 (as a DRAM device, for example) over the bus 112, which in this example would be a memory bus.

The device bus controller 147 manages access to the bus drivers and receivers 149, by different functional unit blocks of its respective device 108. These functional unit blocks include, for example, an internal bus 151 (that may be connected to other functional unit blocks, not shown, that communicate over the bus 112), registers 153 (including, for example, configuration registers that allow the device 108 to be configured over the bus 112 by the CPU 104 executing certain software or firmware), and internal logic 155 which encompasses additional functional unit blocks that wish to communicate over the bus 112, all as part of the device 108. These functional unit blocks are said to perform a core function of the device (e.g., memory; mass storage device control; graphics processing; bridging; etc.). Application-level access to the internal logic 155, registers 153, or internal bus 151 is by addressing the device 108, over the bus 112 only, both during a fully functioning normal mode, as well as in any one of the error correction modes described below. Note that in this example, there is no backup or redundant bus over which the device can communicate application-level content with other devices 108.

According to an embodiment of the invention, each device 108 is enhanced with the addition of an error correction module (ECM) 145 that is coupled between a device bus controller or device bridge 147 and bus drivers and receivers 149. Similarly, the device 116 has an ECM 145 coupled between the bus master controller 127 and the bus drivers and receivers of the device 116. The ECM 145 may be implemented as on-chip logic circuitry, i.e. on-chip with the bus controller 147 or bus master 127. Alternatively, such as in the case of a DRAM device, the ECM 145 and the bus drivers and receivers 149 may be on a separate die than the DRAM device internal bus controller (e.g., on the same memory module as the DRAM device).

The ECM may implement several error correction modes or protocols, as described below. The ECM may be implemented using logic circuitry, including a multiplexer that routes data from received bus signals either directly to the bus controller (transparent mode), or into a bit shifting circuit in line with the bus controller (error correction mode). When a bus failure is detected, the ECM enters an error correction mode of operation. The bit shifting circuit is then configured as part of the "working" error correction protocol of the ECM, to translate normal data frames into ones that have a particular error format.

A failure of the bus 112 may be detected by either the device bus controller 147 or the ECM 145 of any given device 108. The failure is understood as encompassing any failure in a connection associated with a transmission line, such as a failure in the connection between pin 121 of a device connector and pin 131 of the corresponding bus slot. The failure could occur during normal communication after system reset, or during an initial handshake phase where some form of connection is to be first established between two devices on the bus.

In accordance with an embodiment of the invention, the ECM 145 remains transparent to the device bus controller 147 (and bus master controller 127) so long as the bus 112 does not exhibit any failures. When the device bus controller 147 or bus master controller 127 detects a failure in one or more, but not all, of the parallel bus transmission lines 140, control of the bus 112 may be passed to the ECM 145 of each respective device. If specific information about the failure is known, this may be provided to the ECM 145. The ECM 145 may otherwise learn of the failure itself as described below, by scanning the transmission lines 140 through a modified bus protocol. The ECM may be viewed as adapting the "normal" bus protocol to the detected failure, so that the bus protocol remains functional from the point of view of an application program running in the system, despite the failure. Alternatively, the ECM 145 may be viewed as responsible for inserting a logical layer between an upper layer (e.g., application layer) and a lower layer of a bus protocol, that acts as a protocol bridge in the event of a parallel bus failure.

As mentioned above, the ECM 145 may be designed to adapt or make changes to an original bus protocol, to modify the parallel multi-drop bus protocol so that it becomes essentially fault tolerant. Of course, since the failures are expected to be relatively infrequent, the design of an IC device should be optimized to work in the normal mode. A device, and in particular its internal function blocks, should be designed to tolerate slower communications over the bus (when the ECM is active).

A potential problem with determining which error correction mode to use is that in principle, two devices on a failure ridden bus still need to pass a handshake phase, before starting to operate in an error correction mode. However, some change to the original bus protocol needs to be made in order to deliver reliable information and thereby pass the handshake phase. Accordingly, an embodiment of the invention is a modified, or fault tolerant bus protocol that works in multiple phases. The first phase is referred to as a detect handshake mode, the second phase is the failure analysis mode, and the third is the working or error correction (EC) data transfer mode. Upon learning of a failure, operation starts with the detect handshake mode, and once the two devices pass a handshake, the failure analysis mode, and then the working mode is entered by both devices. These will be described in more detail below.

Figure 2:
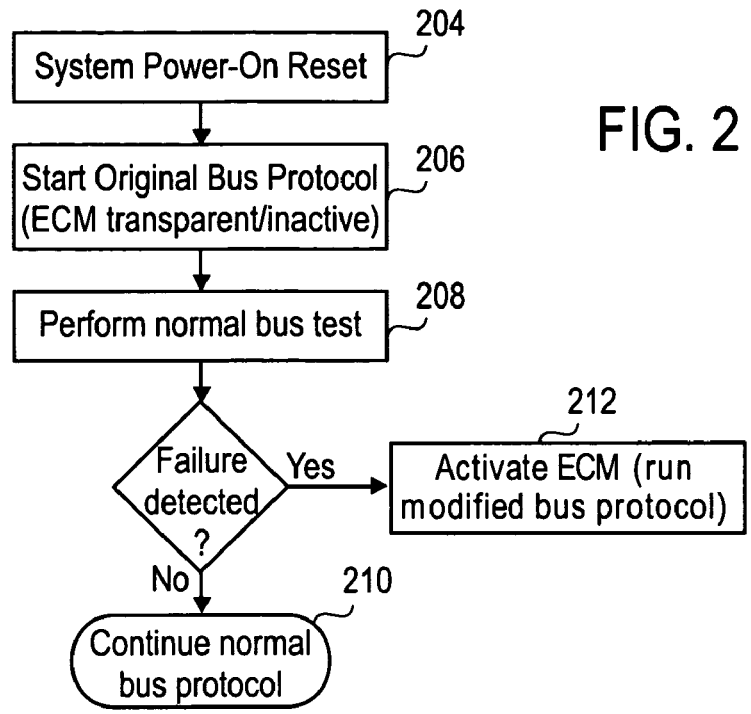
FIG. 2 is a flow diagram of a process running in a system that has an error correction module in accordance with an embodiment of the invention.
Figure 3:
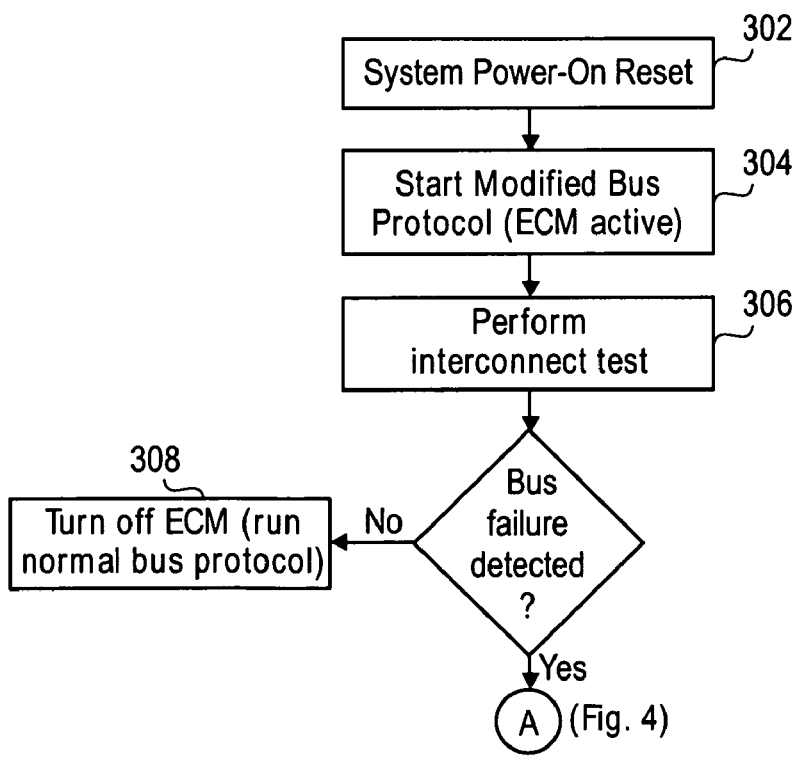
FIG. 3 is a flow diagram of another process for engaging an error correction module in a computer system.

There are at least two ways of entering the modified bus protocol (or protocol bridge), in accordance with an embodiment of the invention. These are depicted in FIGS. 2 and 3. First, after a power on reset (operation 204), the original bus protocol begins as the devices perform a conventional handshake with each other and, in the case of, for example, a memory subsystem, perform a conventional memory bus test (operations 206 and 208). If there are no problems detected on the bus, then operation continues with the normal bus protocol (operation 210). If, however, a failure is detected on the bus, then the ECM is activated on each device (operation 212). This is where the ECM 145 may take over control of the bus, in accordance with the modified bus protocol.

Alternatively, as seen in FIG. 3, the modified bus protocol may start automatically after each power on reset (operations 302 and 304, where ECM is active) and perform an interconnect test between the devices of a bus that have ECM capability (operation 306), and if no errors are discovered, then the normal protocol is taken (ECM becomes inactive or transparent, operation 308). If there is an error or failure, then an attempt is made to find a reliable EC handshake protocol (operation 404, FIG. 4), as described below.

Figure 4:
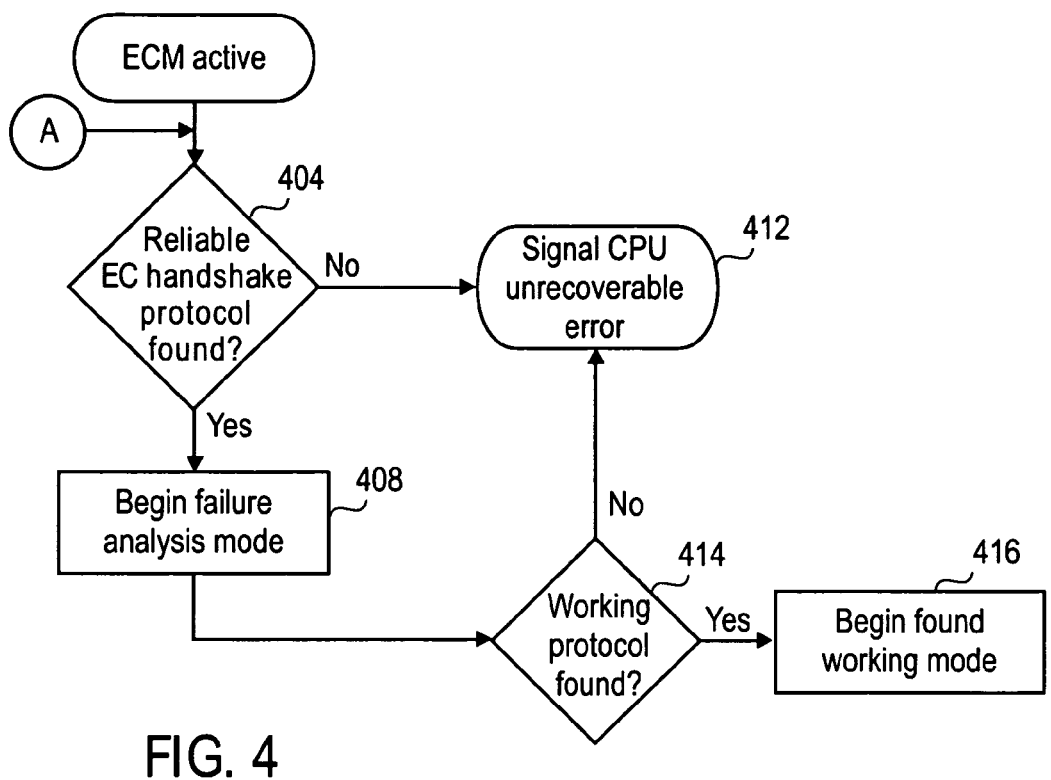
FIG. 4 depicts a process flow of an overview of running an error correction protocol, in accordance with an embodiment of the invention.

Referring now to the flow diagram of FIG. 4, consider a device that is either operating normally in its normal bus protocol, or otherwise is emerging from a power on reset. A bus failure has been detected, and hence the ECM has been activated. The handshake mode is designed to acknowledge that both sides of a connection (that is, two devices that are communicating with each other on the bus, where one is considered a bus master and the other a slave), support one or more predefined error correction protocols. For example, a list of the different error correction protocols that are supported by each side may be determined and communicated with the other side. Also, the quality of the connection may be tested. It is possible that although a failure has been detected, the severity of the failure is not yet known to the ECM. For example, the failure may be quite serious if, for instance, a clock signal line or a power line has been compromised.

To find a reliable handshake protocol (operation 404), if the device is a bus master, then it can scan for different error correction protocols in a predefined order. For example, for each possible protocol, the bus master is to transfer a particular signature sequence to the slave device. This sequence may be designed such that it does not damage any devices on the bus that do not support any EC modes. In addition, the sequence has to be designed such that each device should be able to detect that it is being scanned (by the signature sequence) for possible error correction protocols. The signature sequence may also be designed to indicate to a particular device what protocol or mode has been proposed by the bus master. The signature sequence may also be used to allow the slave device to synchronize with the bus master. Finally, the signature sequence may be used to resolve conflicts between multiple devices on a bus.

Once a device has recognized a received signature sequence, it replies to the bus master by a reply signature, to acknowledge that it can support a particular error correction protocol or mode. If the bus master in turn recognizes the reply signature, then the bus master will start the next phase of handshake, or move on to failure analysis mode (operation 408). If a working protocol is then found that allows reliable transfers of application layer content (operation 414), for example at a high enough rate, then the ECM enters that working mode in operation 416 and begins to service the higher layers (e.g., all the way up to the application layer).

Alternatively, if a sequence is not recognized, then the bus master can continue to search for the next possible handshake protocol that might be supported by the slave device. If no reliable handshake protocol is found, the CPU of the system is signaled that an unrecoverable error has been encountered (operation 412).

The signature referred to above may be part of a sequence of data words, where each data word has a number of bits equal to the number of bus transmission lines that are being used to transfer the data word in parallel. Each signature may be a set of bits, such as all bits being up or down except for a single bit, which is moved from one signature to the other in the sequence so as to scan sequentially the transmission lines, one or more times. In one embodiment, the ECM assumes that power, clock and device select lines that are part of the bus operate properly. See below for the situation where one or more of these control lines has a failure. Once a device has detected a particular signature sequence, the device is given time to repeat the sequence. If the select line or select input of a device is inactive, or there are one or more bits that do not behave normally, then the receiving device (slave device) does not replay the sequence. This corresponds to the situation where the failure is catastrophic (leading to operation 412), even where the devices contain a protocol bridge in accordance with an embodiment of the invention.

Once reliable communication has been achieved between the bus master and the slave device (operation 404), despite the failure of one or more lines of the bus, a failure analysis mode is entered into in which both sides may exchange information about the working error correction modes that they support (operation 408). Note that although in the handshake phase, reliable communication has been established, that does not guarantee that the ECMs have knowledge of the "best" working protocol for the failure ridden bus. It is during the failure analysis stage that the two sides determine which is the best working error correction mode to use in order to transfer higher layer data (e.g., payloads originating at the application layer). In this mode, each line may be scanned to determine its reliability at high speed. A goal here is to determine which is the optimal mode of operation that best simulates the physical layer and/or other lower layers of the original protocol, to the upper layers, over a "broken" actual physical layer.

Once the optimal working EC mode has been found (operation 414), the ECMs begin data transfers over the bus, in that working mode (operation 416). The additional logical layer here (presented by the ECM) presents at least one additional clock of delay to transfer data over the bus, due to the calculations and mapping (multiplexing, bit shifting, etc.) it performs to emulate a fully functioning physical layer. The processing performed in the ECM may thus add additional latency to bus transactions, from the point of view of the original bus protocol's higher layers.

There are several different types of error correction modes contemplated. There may be multiple handshake modes, as well as multiple working modes. Since it is important to resume bus transfers fairly quickly, once a failure has been detected, the number of different supported handshake modes should be relatively few. As to the working modes, these should be designed to deliver the best performance over a broken bus.

Handshake Modes

Each handshake mode may be based on a fixed mapping, from an original pin out to the mode pin out. There may be two modes in which each pin is duplicated twice. Modes with each pin that have been duplicated three, four or a greater number of times, until all physical bits represent a single logical bit. In addition, the handshake modes should preferably set higher priority to certain important control signals, such as a clock, at the price of data lines. If it happens that a mode that uses a dock signal does not work, then an asynchronous protocol can be used. This may present additional degradation in the transfer of data between devices. Finally, it should be noted that the handshake may be performed with a protocol that has no relation to the original bus protocol. As an example, the switch-to-switch protocol, SSP, may be used which requires only four reliable pins on the bus, plus power.

Working Modes

There are multiple working modes, where each is selected based on the knowledge that has been obtained by the ECM about which particular bus lines exhibit a failure. For example, if there is a failure in a particular pin of a device connector, then the bits of the data frames that are to be transferred over that pin need to be mapped to one or more of the other remaining, functional pins. Each such pin may be assigned its own working protocol. Each data frame that is received from an upper layer (e.g., all the way to an application layer), is then mapped or translated from a normal format to a particular working, error correction format, so that the information that would have been transmitted over the failed bit can now be recovered over one or more of the remaining (usually fewer) functional bits. Thus, as an example, where a sequence of original frames were transferred by the bus controller to the bus drivers at a rate of one per dock, could be mapped to 2, 3, or other integer number of frames. Where the physical layer transport of such frames is not changed, the error correction mode in this case dearly presents an additional delay of one or more docks in order to transfer the same, original frame. Note that another option here is to interleave frames. For example, three physical docks may be spent to transfer information from two logical frames. Other variations to mapping or translating bus transaction information and data between a normal format and an error correction format are possible.

When splitting a data frame, that originally would have been transferred by a single bus transaction, into two or more transactions (for transferring two or more translated frames), the receiving ECM will ignore any bits (in a received, translated data frame) that are associated with the failed transmission line. It can be seen that in many cases, where the failure resides in a single or at most a handful of transmission lines, the degradation in latency or throughput in the error correction mode is relatively small, if the parallel bus has a relatively large number of transmission lines that are used for the transactions. It is expected that the degradation in performance is less with larger (wider) parallel buses.

If the ECM is designed to make changes to the physical layer of an original bus protocol (for example, having the capability of remapping power and clock signals to other pins of a connector that are normally used for address and/or data) then additional fault tolerance may be achieved, albeit at a greater expense due to the changes to the physical layer. In most cases, it is expected that the error correction protocol that can handle only the loss of address or data pins need not make any changes to the physical layer of the device. However, if as mentioned above, the ECM is to handle failures in power or dock lines, then physical layer changes should be contemplated so that reliable power and clocks can be rerouted to the other remaining, good pins of the device.

The following examples illustrate where the ECM can save an otherwise catastrophic failure situation, without any change to the physical layer of the devices. Consider a memory bus that has good and bad memory modules connected to it. A bad module has lost an address wire. To save this failure situation, the ECM associated with the bus master (part of a memory controller) can transfer the left and right parts of a memory address over two bus cycles (or docks), instead of just one. The ECM in the memory module will consume an additional dock to receive the second part of the address (shifted onto the "good" part of the address bus by the ECM) plus one more clock to calculate the real address and then pass the real address to the internal logic (in this case, the memory storage array address decoders). Thus, the internal logic in the memory module needs to accept the address within three, instead of a single, dock delay. Many systems can continue to run application level programs in this delayed manner (albeit at lower performance).

As another solution to the same problem posed above, consider a DRAM memory module that receives an address in two portions, namely, in this case, a column address and a row address. In most cases, these correspond to the upper and lower halves of the address. The upper part is typically saved in some register within the memory controller. In most cases, the controller updates only the lower part of the address in a sequence of transactions, so long as the transactions are accessing the same page in memory. Most transactions are grouped into the same page and only relatively infrequently do they change pages. Now, if a handful or so of the address pins of the bus are broken or otherwise have failed, the ECM will respond by changing the addressing scheme so that an address is divided into three, for example, instead of two parts. Each of these three parts is loaded with a separate command. Each part can be transferred from the bus master to the slave in smaller amounts, than in the original. The slave module does not have to actually recognize this division of the address and instead may continue to work in the original bus protocol, including original speed and original physical layer parameters.

The above described concept of error correction protocols can be extended all the way to a single wire bus (where all but a single data transmission line, or a line pair in the case of differential bus lines, of the attachment bus has failed). However, that is not considered a likely possibility in practice and, given the relatively large amount of information that needs to be transferred for the application layer of most systems, a single wire bus protocol is not contemplated to be one of the error correction modes.

As was mentioned above, ECM may be implemented by a combination of hardware and software, including a programmable bit shifting logic network (configured in accordance with the particular error protocol in view of the particular failures on the bus), registers to save data, and a state machine to manage the overall operation of the ECM (e.g., transitioning from one mode to the other). As with other conventional bridges, the protocol bridge described here may be configured by a software driver (operating system level) that runs on the CPU of the system.

In accordance with another embodiment of the invention, the protocol bridge may be designed to simulate another bus protocol. For example, consider where the original bus protocol is a relatively high speed memory bus protocol, such as a Double Data Rate 2 (DDR2) random access memory, whereas the memory modules that are actually inserted into the connector slots of the bus are of the Double Data Rate (DDR) or synchronous DRAM (SDRAM) type.

In accordance with an embodiment of the invention, if a parallel bus has physical damage, then the error control protocol bridge as described here, can be activated on both ends of the bus to run another protocol, over the same physical bus, which will become a transport layer for the original protocol. In accordance with another embodiment of the invention, a variable pin number protocol is described which can handle dynamic changes in the number of pins, as well as non-reliable pins. For example, the error correction protocol may work with an N-bit (N wide) connector, as well as an N/2-pin connector. The latter may be used for portable machines, such as notebook computers, while the larger one may be used for higher throughput machines, such as desk tops and servers. Using an error correction protocol bridge, a device that has an N/2-pin connector can be used in a system whose parallel bus contains N-pin or bus slots. As another alternative, two, N/2-pin connector devices could be inserted into a single, N-pin bus slot. Other variations include N/3, N/4, and others.

Figure 5:
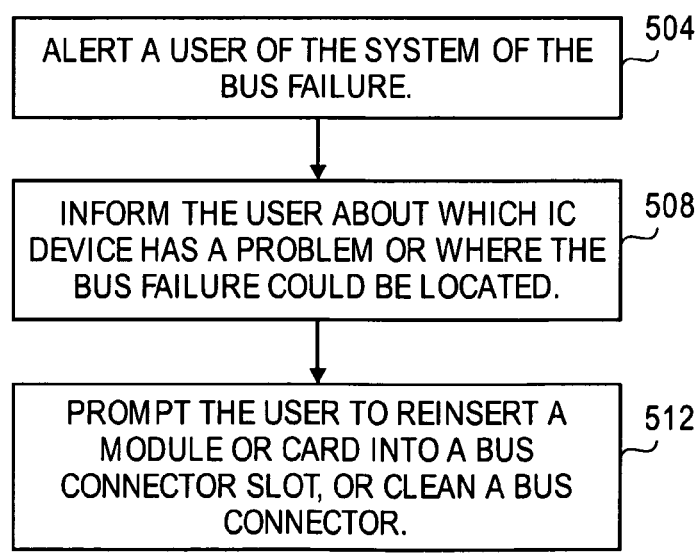
FIG. 5 is a flow diagram of operations that inform the user of a failure being handled by an error correction module.

In FIG. 5, a flow diagram for informing the user of the bus failure is shown, in accordance with an embodiment of the invention. Once the bus failure has been analyzed by the ECM and a working EC mode has been found, the user can be given the option to shut down the computer manually and attempt to remediate the bus failure. Accordingly, in operation 504, the user is alerted of the bus failure. This may be done by the ECM communicating with an operating system driver that allows a pop-up window to appear on the display of the system before the user. The pop-up window may inform the user about which IC device in the system has a problem or where the failure could be located on the bus (operation 508). In addition, the pop-up window may prompt the user to reinsert a memory module or an add-in card into a bus connector slot, or perhaps indicate that a bus connector associated with the bus may need to be cleaned or otherwise checked before making the proper connection (operation 512). As yet another alternative, the prompt may indicate to the user that the wrong type of module or add-in card has been inserted. These informing remarks may also be accompanied by a statement that indicates the system is nevertheless operational, albeit perhaps at a lower performance level (leaving it open to the user to decide whether to open the chassis of the system to actually perform any repairs or module or card reinsertions).

An embodiment of the invention may be a machine readable medium having stored thereon instructions which program a processor to perform some of the operations described above. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), and Erasable Programmable Read-Only Memory (EPROM).

The invention is not limited to the specific embodiments described above. For example, in addition to the transmission line failures described above, such as broken wires, bad contacts, or short circuits, the error correction module described above may also work in situations where a driver or receiver circuit of an I/O buffer has failed. Accordingly, other embodiments are within the scope of the claims.

What is claimed is:

1. An integrated circuit (IC) device comprising:
    a function block to perform a core function of the IC device;
    a bus controller through which the function block is to communicate with another IC device with a bus protocol over an attachment bus having a plurality of bus transmission lines; and
    an error correction module (ECM) to adapt the bus protocol to a failure involving one or more but not all of the bus transmission lines, so that the bus protocol remains functional for the function block to communicate, with the other IC device via the bus controller, despite the failure,
    wherein, after detection of the failure, the ECM is to perform a handshake procedure with the other IC device via the bus by transferring one or more signature sequences until a reply is received from the other IC device, each signature sequence indicates to the other IC device that a corresponding error correction mode is supported by the ECM, the reply to acknowledge that one of the corresponding error correction mode is supported by the other IC device, the one corresponding error correction mode to be used as a mutually agreed upon error correction protocol for the IC device to communicate with the other IC device in the presence of the failure.

2. The IC device of claim 1 wherein the bus controller is to generate a plurality of address signals and a plurality of control signals on the plurality of bus transmission lines, respectively, of a parallel bus.

3. The IC device of claim 1 wherein the function block comprises a memory controller to access a random access memory device via the bus.

4. The IC device of claim 1 wherein the function block comprises a random access memory array.

5. The IC device of claim 1 wherein the ECM is to operate in a plurality of error correction modes including a handshake mode and a working mode,
 wherein the handshake mode is used to acknowledge that both the IC device and the other IC device can communicate with one another over the bus despite the failure,
 and wherein the working mode is used to transfer application level content between the IC devices over the bus despite the failure, according to a mutually agreed upon error correction protocol.

6. A method for performing a protocol bridge by an integrated circuit (IC) device in a personal computer, comprising:
 communicating with another IC device of the personal computer in accordance with an upper layer and a lower layer of a communications protocol over an attachment bus of the personal computer;
 learning of a failure involving one or more but not all of a plurality of bus transmission lines of the bus;
 after detection of the failure, performing a handshake procedure with the other IC device via the bus by transferring one or more signature sequences until a reply is received from the other IC device, each signature sequence indicating to the other IC device that a corresponding error correction mode is supported by the IC device, the reply acknowledging that one of the corresponding error correction mode is supported by the other IC device, the one corresponding error correction mode to be used as a mutually agreed upon error correction protocol in the presence of the failure; and
 inserting a logical layer between the upper and lower layers according to the mutually agreed upon error correction protocol, and communicating with the other IC device via the bus, using the logical layer and in accordance with the upper layer and despite the failure.

7. The method of claim 6 wherein learning of the failure comprises detecting the failure during the handshake procedure with the other IC device.

8. The method of claim 6 further comprising alerting a user of the bus failure and informing the user about which IC device has a problem or where the failure could be.

9. The method of claim 8 further comprising prompting the user to re-insert a module or card into a bus connector slot or clean a bus connector associated with the bus.

10. The method of claim 6 wherein communicating with another IC device in accordance with the upper layer and the lower layer comprises:
 generating a plurality of address signals and a plurality of control signals on the plurality of bus transmission lines, respectively.

11. The method of claim 6 wherein communicating with the other IC device over the bus, using the logical layer and in accordance with the upper layer and despite the failure, comprises:
 operating in a plurality of error correction modes including a handshake mode and a working mode,
 wherein the handshake mode is used to acknowledge that the IC devices can communicate with one another over the bus despite the failure,
 and wherein the working mode is used to transfer application level content between the IC devices over the bus despite the failure, according to a mutually agreed upon error correction protocol.

12. A personal computer comprising:
 a central processing unit (CPU);
 a CPU bus;
 an attachment bus system having a plurality of connector slots;
 a first integrated circuit (IC) device coupled to the CPU via the CPU bus, the first IC device having bridge circuitry couples the CPU bus to the attachment bus system, and a first error correction module (ECM) coupled between the bridge circuitry and the attachment bus system; and
 a second IC device that is connected to the attachment bus system through a connector that mates with one of the connector slots, the second IC device having core function logic circuitry, and a second ECM coupled between the core function logic circuitry and the connector,
 the first and second ECMs to perform a handshake procedure with each other over the attachment bus system while there is a failure in one or more transmission lines of the attachment bus system, and translate bus transaction information and data between a normal format and an error correction format, the normal format being used when the attachment bus system has no failures in its transmission lines, the error correction format being used in accordance with mutually agreed upon error correction protocol when the attachment bus system has failures in one or more of its transmission lines,
 wherein, after detection of the failure, the first ECM is to perform the handshake procedure with the second ECM via the attachment bus system by transferring one or more signature sequences until a reply is received from the second ECM, each signature sequence indicates to the second IC device that a corresponding error correction mode is supported by the first IC device, the reply to acknowledge that one of the corresponding error correction mode is supported by the second IC device, the one corresponding error correction mode to be used as the mutually agreed upon error correction protocol for the first IC device to communicate with the second IC device in the presence of the failure.

13. The computer system of claim 12 wherein the attachment bus system comprises a plurality of multi-lane serial point-to-point links.

14. The computer system of claim 12 wherein the attachment bus system comprises a main memory bus and the second IC device is part of a random access memory module coupled to the memory bus.

15. The computer system of claim 14 further comprising a third IC device that is connected to the attachment bus system through a connector that mates with another connector slot of the bus system, wherein the third IC device has a third ECM to perform a handshake with the first IC device over the bus system while there is a failure in one or more transmission lines of the bus system, and translate bus transaction information and data between a normal format and an error correction format, the normal format being used when the bus system has no failures in its transmission lines, the error correction format being used when the bus system has failures in one or more of its transmission lines.

16. An article of manufacture comprising:

a machine readable storage medium having stored therein instructions which, when executed by a personal computer (PC), cause an IC device in the PC to perform a handshake procedure, followed by a working procedure, with another IC device of the PC over a bus system of the PC that has physical damage causing a failure in one or more transmission lines of the bus system, wherein the handshake procedure is to acknowledge that the IC devices can communicate with one another over the bus system despite the one or more failed lines, wherein, after detection of the failure, the IC device is to perform the handshake procedure with the other IC device via the bus system by transferring one or more signature sequences until a reply is received from the other IC device, each signature sequence indicates to the other IC device that a corresponding error correction mode is supported by the IC device, the reply to acknowledge that one of the corresponding error correction mode is supported by the other IC device, the one corresponding error correction mode to be used as a mutually agreed upon error correction protocol in the presence of the failure, and the working procedure is to transfer application level content between the IC devices over the bus system despite the one or more failed lines, according to the mutually agreed upon error correction protocol.

17. The article of manufacture of claim 16 wherein the machine readable storage medium includes further instructions that when executed by the PC cause the IC device to alert a user of the PC of the bus failure, and inform the user about where on the bus the failure could be located.

18. The article of manufacture of the claim 17 wherein the machine readable storage medium comprises further instructions that when executed by the PC prompt the user to reinsert a memory module or add-in card into a bus connector slot of the bus system.

* * * * *